(12) United States Patent
Wang et al.

(10) Patent No.: US 7,006,256 B2
(45) Date of Patent: Feb. 28, 2006

(54) WATERMARKED IMAGE GENERATOR AND METHOD OF EMBEDDING WATERMARKS INTO AN INPUT IMAGE

(75) Inventors: Shen-ge Wang, Fairport, NY (US); Hui Cheng, Bridgewater, NJ (US); Zhigang Fan, Webster, NY (US); Ying-wei Lin, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 808 days.

(21) Appl. No.: 09/683,540

(22) Filed: Jan. 16, 2002

(65) Prior Publication Data

US 2003/0133163 A1    Jul. 17, 2003

(51) Int. Cl.
*H04N 1/46* (2006.01)

(52) U.S. Cl. ........................ 358/3.28; 358/3.3; 382/100
(58) Field of Classification Search ................ 382/100, 382/232; 358/3.28, 3.3, 534; 713/176, 179; 283/72, 74–81, 85.93, 113, 901, 902, 85, 283/93; 386/94; 380/51, 54, 210, 252, 287
See application file for complete search history.

(56) References Cited

U.S. PATENT DOCUMENTS

| | | | |
|---|---|---|---|
| 5,734,752 A | * | 3/1998 | Knox ........................ 358/3.28 |
| 5,790,703 A | | 8/1998 | Wang |
| 5,946,103 A | | 8/1999 | Curry |
| 6,081,345 A | * | 6/2000 | Curry ........................ 358/3.28 |
| 6,690,811 B1 | * | 2/2004 | Au et al. .................... 382/100 |
| 6,731,407 B1 | * | 5/2004 | Hayama ..................... 358/3.2 |
| 6,771,391 B1 | * | 8/2004 | Konishi et al. ............... 358/1.9 |
| 6,823,075 B1 | * | 11/2004 | Perry ........................ 382/100 |

* cited by examiner

*Primary Examiner*—Kanjibhai Patel
*Assistant Examiner*—Abolfazl Tabatabai
(74) *Attorney, Agent, or Firm*—Oliff & Berridge, PLC

(57) ABSTRACT

A watermarked image generator includes a watermark data source that inputs watermark data to a watermark embedding device. The watermark embedding device halftones the input image to generate the output image made of 2×2 binary patterns, the 2×2 binary patterns forming the watermarks embedded in the output image. The watermark embedding device includes a tri-level error diffusion generator that performs tri-level error diffusion on the input image by halftoning the input image into black, white and 50% gray. A plurality of halftoning circuits successively replace each pixel of the halftoned input image with one of a plurality of the 2×2 binary patterns. The one of the plurality of 2×2 binary patterns corresponds to at least one respective bit of the watermark data when a pixel of the halftoned image data is 50% gray. The watermark data can be segmentation map data of the input image.

16 Claims, 16 Drawing Sheets

FIG. 8A
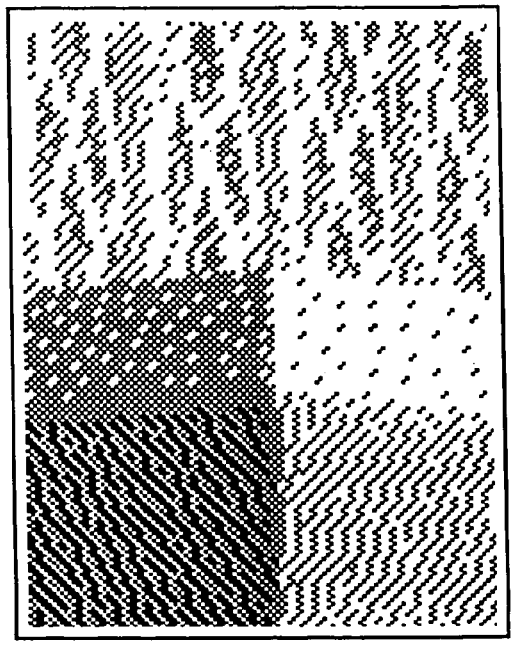
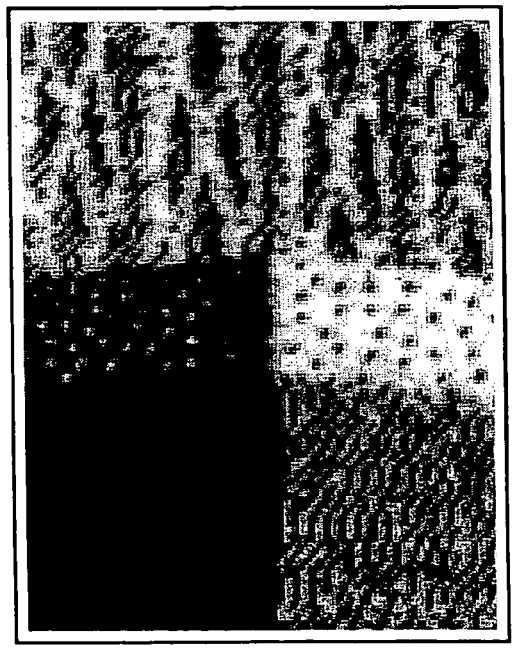
FIG. 8B

FIG. 9
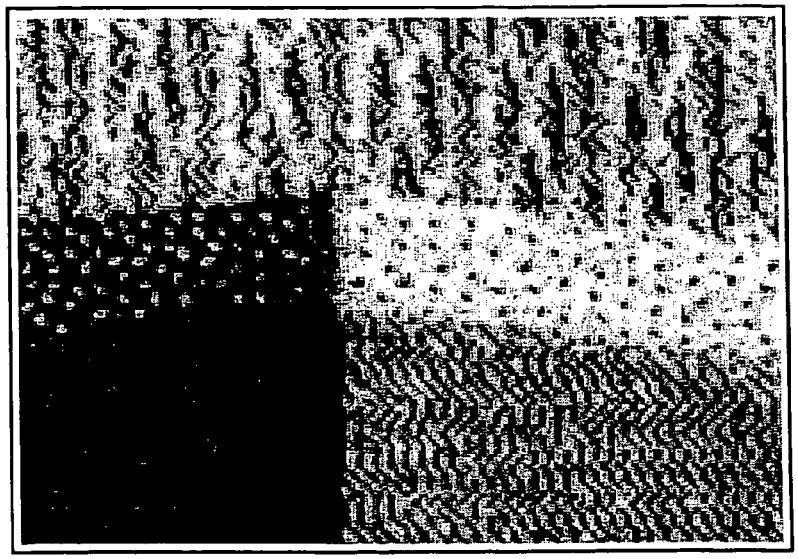
FIG. 10

WATERMARKED IMAGE GENERATOR AND METHOD OF EMBEDDING WATERMARKS INTO AN INPUT IMAGE

BACKGROUND OF THE INVENTION

1. Field of Invention

This invention is related to embedding watermarks in input images to form watermarked output images.

2. Description of Related Art

With the advent of digitization of images, digital image distribution and digital video availability, the "hiding" of information in digital images for purposes such as copyright protection has become a substantial issue for image publishers and authors. The process of imbedding information in a digital image is known as "watermarking". Such watermarks must be secure, robust to intentional corruption and to compression processing, not unreasonably complex to embed and extract, and compatible and interoperable with conventional image processing systems. The watermark is generally invisible to a viewer. However, in some applications, it is desirable to produce a visible watermark that can be removed by an authorized image decoder and that can not be removed by an unauthorized decoder.

Many watermark algorithms have been proposed. However, only a few watermark algorithms have been designed for printed images. U.S. Pat. No. 5,734,752 to Knox discloses a method of using stochastic screens to create correlation-based digital watermarks. The concept of conjugate halftone screens for watermarking is proposed in U.S. Pat. No. 5,790,703 to Wang. The methods disclosed in Knox and Wang might not be suitable for applications which require dynamically changing watermark information, because the watermarks in those methods can only be embedded during the screen design process for the halftone screen that will be used when printing a given image. U.S. Pat. No. 5,946,103 to Curry discloses a method that uses glyphs to digitally watermark a printed document. However, glyph encoding typically generates images with noticeable structures. This makes this method suitable only for specific applications.

SUMMARY OF THE INVENTION

This invention provides systems and methods that embed watermarks in input images to produce output images having relatively high watermark resolution.

This invention separately provides systems and methods that embed watermarks in input images to produce output images having a relatively small amount of noticeable artifacts.

This invention separately provides systems and methods that dynamically embed any type of watermark in an input image at run-time.

In various exemplary embodiments of the systems and methods according to this invention, a watermark image generator includes a watermark data source that inputs watermark data to a watermark embedding device. The watermark embedding device halftones the input image to generate the output image made of 2×2 binary patterns. The 2×2 binary patterns form the watermarks embedded in the output image. The watermark embedding device includes a tri-level error diffusion generator that performs tri-level error diffusion on the input image by halftoning the input image into black, white and 50% gray. A plurality of halftoning circuits successively replace each pixel of the halftoned input image with one of a plurality of the 2×2 binary patterns. The one of the plurality of 2×2 binary patterns corresponds to at least one respective bit of the watermark data when a pixel of the halftoned image data is 50% gray.

In various exemplary embodiments of the watermarked image generator according to this invention, when a pixel of the halftoned input image data is 50% gray, the one of the 2×2 binary patterns forms one of a plurality of polarized patterns. The one of the plurality of polarized patterns is polarized according to the value of the respective bit of the watermark data.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIG. 8A shows a portion of the digital version of the image shown in FIG. 6 after being watermarked by the first exemplary embodiment of the method of embedding watermarks in an input image according to this invention;

FIG. 8B shows the same portion of the image shown in FIG. 6 that is shown in FIG. 8A after being printed and scanned;

FIG. 9 shows one region of the image shown in FIG. 6 after being embedded with a bar code by the first exemplary embodiment of the method of embedding watermarks in an input image according to this invention;

FIG. 10 shows another region of the image shown in FIG. 6 after being embedded with a bar code by the first exemplary embodiment of the method of embedding watermarks in an input image according to this invention;

DETAILED DESCRIPTION OF PREFERRED EMBODIMENTS

The various exemplary embodiments of the methods and apparatus according to this invention use a watermarking algorithm known as bipolar encoding through error diffusion. This algorithm employs polarized dot structures for data encoding.

Figure 1:
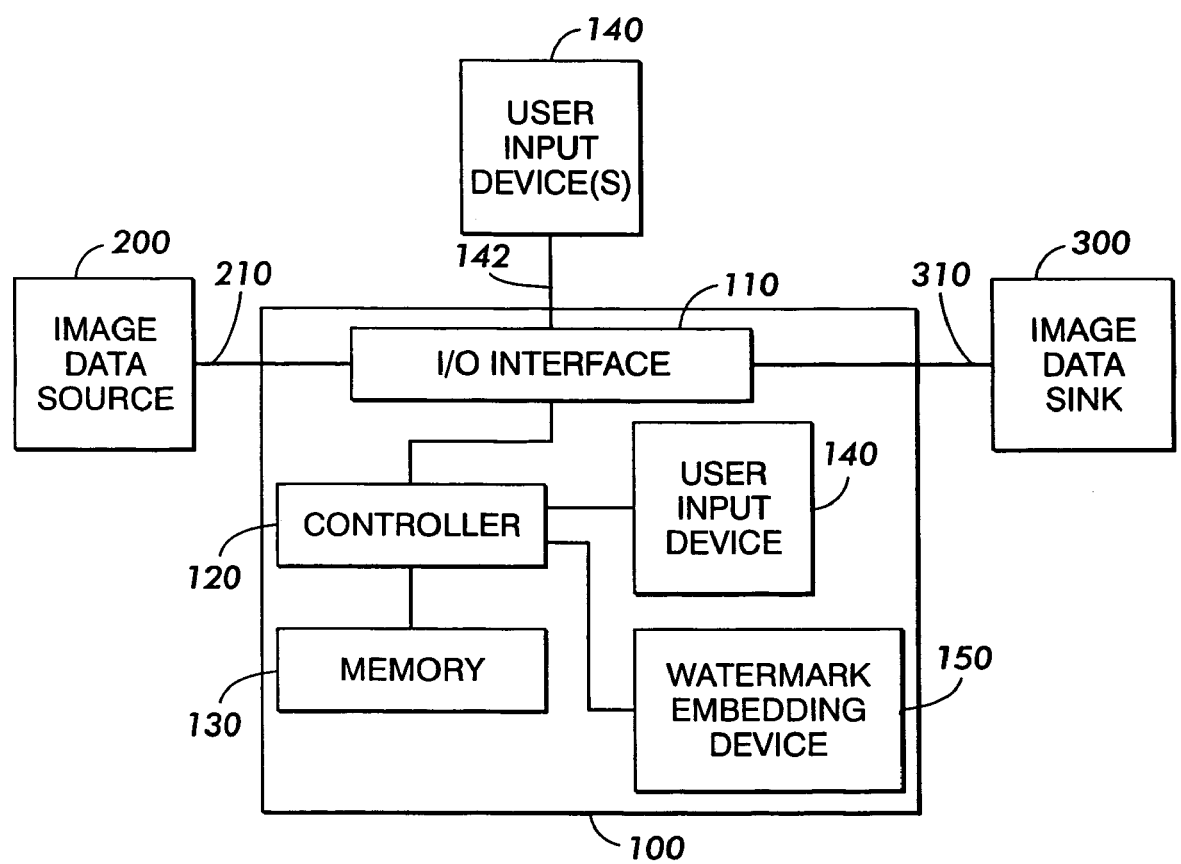
FIG. 1 shows a first exemplary embodiment of the watermarked image generator according to this invention.

FIG. 1 shows one exemplary embodiment of a watermarked image generator 100 for embedding watermarks in an input image according to this invention. As shown in FIG. 1, an input image is input from an image data source 200 over a link 210 to the watermarked image generator 100. It should be appreciated that the image data source 200 can be any device that stores and/or generates an electronic version of an image.

Thus, the image can be a printed hard copy version of the image, and the image data source 200 can be a scanner that scans and outputs an electronic version of the image over the link 210 to the watermarked image generator 100. Furthermore, the image data source 200 and the watermarked image generator 100 can be elements integrated into a photocopier.

Similarly, the image data source 200 can be a server or other node on a local area network, a wide area network, an intranet, the Internet or any other distributed network. In this case, the image is already stored on the network in electronic form.

Finally, the link 210 can be a wired or wireless link to the image input device 200. Thus, the image data source 200 and the link 201 can be any known or later-developed elements that are capable of supplying an electronic image to the watermarked image generator 100.

As discussed above, the system and methods of this invention work equally well on images that have not been transferred to hard copy. In this case, the image is already in digital form and the image is ready for processing by the watermarked image generator 100.

The watermarked image generator 100 includes an input interface 110, a controller 120, a memory 130, one or more user input devices 140, and a watermark embedding device 150. The one or more user input devices 140, the image input device 200 and an image data sink 300 are connected to the watermark embedding device 100 via the input/output interface 110.

In operation, grayscale image data is received from the image input device 200 via the link 210 and the input/output interface 110 of the watermarked image generator 100. The input/output interface 110 forwards the input image data received from the image input device 200, under the direction of the controller 120, to the watermark embedding device 150. A watermark is stored in the memory 130, or a particular watermark can be input by the user through the user input device 140 and/or the image data source 200. The watermark embedding device 150 halftones the input image data to output an image made up of 2×2 binary patterns. The 2×2 binary patterns form the watermarks that are embedded in the halftone output image. The halftone output image containing the visible watermark is then output, via input/output interface 110 and the link 310 to the image data sink 300.

It should be appreciated that the image data sink 300 can be any device or combination of devices that outputs or displays the resulting halftone image data. Thus, the resulting image can be a printed version of the input image, and the image data sink 300 can be a printer. Similarly, the image data sink 300 can be a monitor which is capable of displaying the electronic version of the resulting halftone image for viewing. Furthermore, the image data source 200, the watermarked image generator 100, and the image data sink 300 can be elements integrated into a single device, such as a digital photocopier.

Similarly, the image data sink 300 can be a server or other node on a local area network, a wide area network, an intranet, the Internet, or any other distributed network. In this case, the resulting halftone image is transferred and stored on the network in electronic form. Finally, the link 310 can be a wired or wireless link to the image data sink 300, to any other image output device or display device, or to the network. Thus, the image data sink 300 and the link 310 can be any known or later-developed systems and methods that are capable of receiving, and outputting or storing, the resulting electronic halftone image data generated by the watermarked image generator 100.

Figure 2:
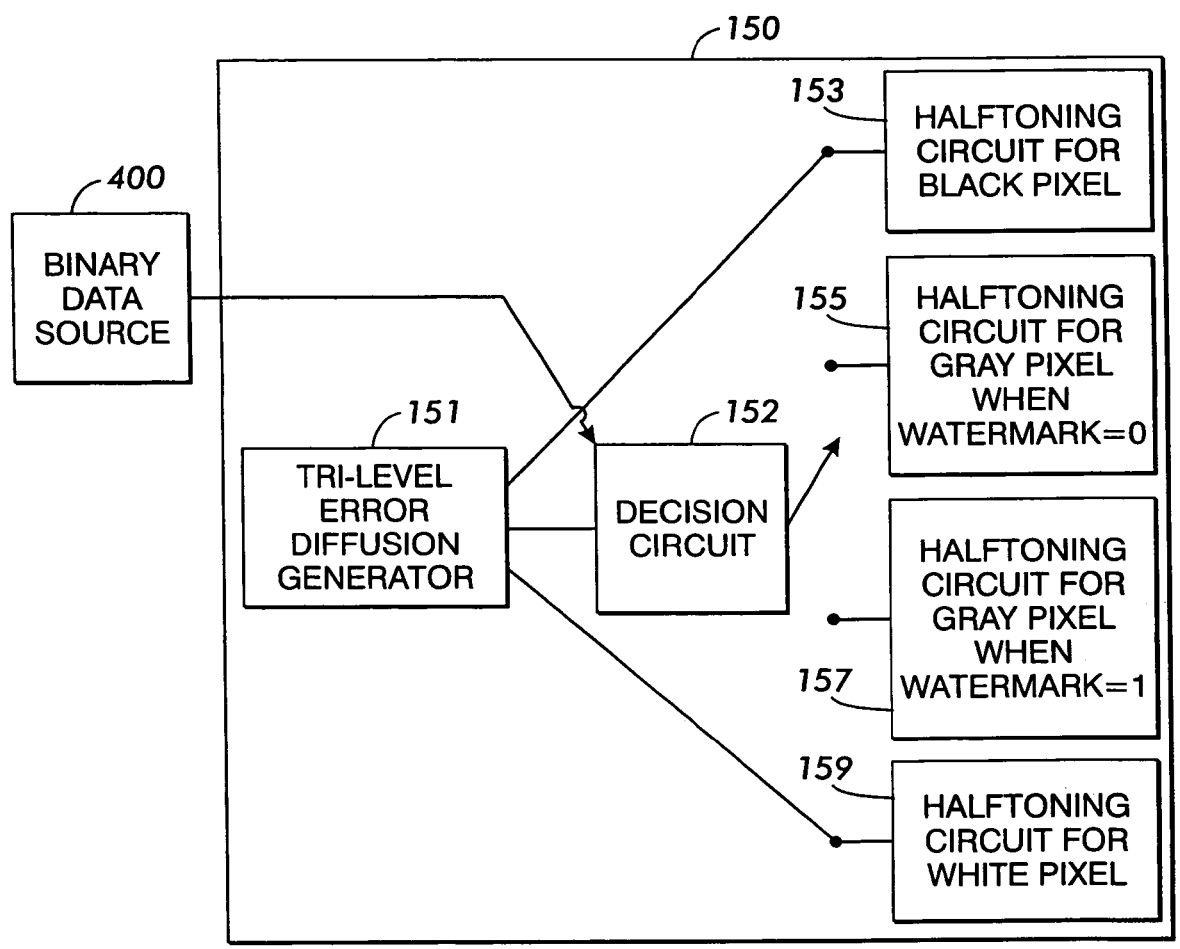
FIG. 2 shows a first exemplary embodiment of a watermark embedding device according to this invention.

FIG. 2 shows a first exemplary embodiment of the watermark embedding device 150 according to this invention. As shown in FIG. 2, the watermark embedding device 150 includes a tri-level error diffusion generator 151, a decision circuit 152, and halftoning circuits 153, 155, 157 and 159. As will be described in greater detail, the watermark embedding device 150 halftones the input image to output an image made up of 2×2 binary patterns by using a two-stage halftoning process with error diffusion.

The image input device 200 inputs the original grayscale or continuous tone image data to the tri-level error diffusion generator 151. The tri-level error diffusion generator 151 halftones the original continuous tone image data by tri-level error diffusion into three gray levels. This is performed at a reduced resolution. Specifically, each of the 2×2 pixels of the input image are grouped into one super pixel. The value of the super pixel is defined to be the average of the 2×2 pixels. The error diffusion is then performed on the super pixels. The three gray levels to which the reduced-resolution continuous tone image is halftoned are black, white, and 50% gray. The process of error-diffusion, including tri-level and other multi-level error diffusion, is well known in the art. In general, any known or later-discovered error diffusion process is suitable for use with the systems and methods according to this invention.

After the input image is halftoned by the tri-level error diffusion generator 151, the halftoning circuits 153, 155, 157 and 159 replace each one of the pixels of the halftoned input image by a corresponding one of four 2×2 binary patterns. Which of the four 2×2 binary patterns is chosen to replace a particular pixel depends on whether the particular halftone pixel from the tri-level error diffusion generator is black, white, or 50% gray, and/or on the value of the binary watermark stored in or input to the watermarked image generator 150 for that particular pixel. The controller 120 sequentially feeds each bit of the binary watermark data stored in the memory 130 or input by the user through the one or more user input devices 140 to the decision circuit 152. The source of the binary watermark data is shown generally in FIG. 2 as a binary data source 400.

Figure 3:
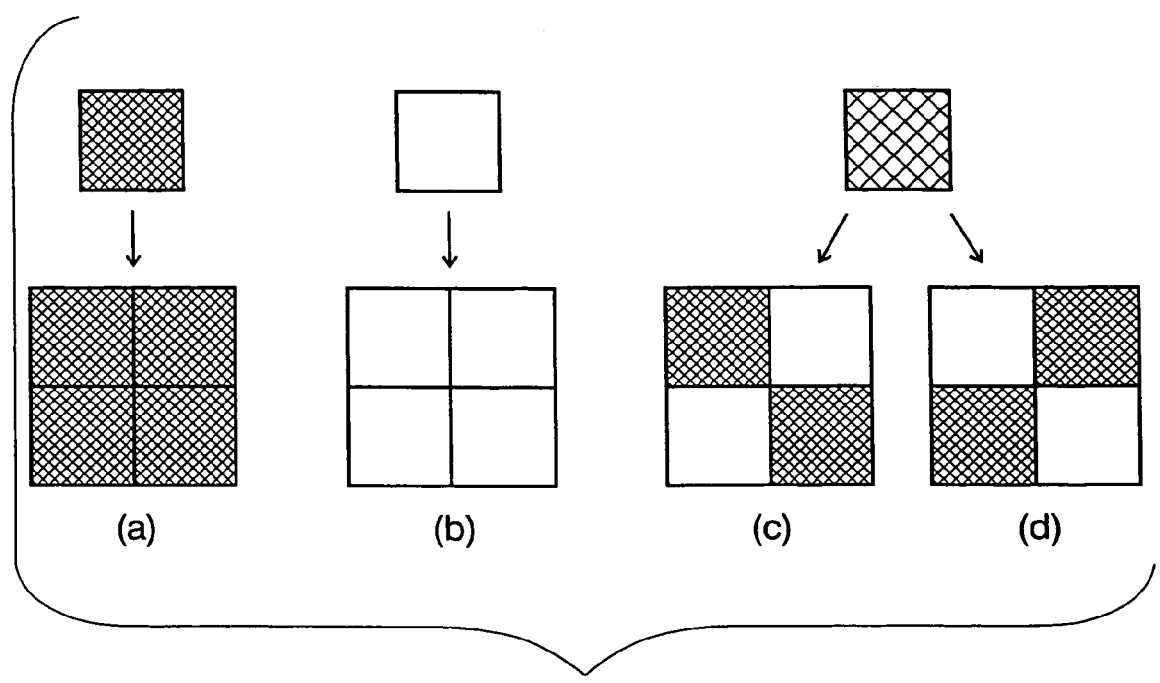
FIG. 3 shows the 2×2 binary patterns generated by the watermarked image generator according the first exemplary embodiment of this invention.

When a pixel of the halftoned input image is black, the decision circuit 152 is bypassed and the halftoning circuit 153 replaces the black pixel with an all black 2×2 binary pattern, as shown in part (a) of FIG. 3. When a pixel of the halftoned image is white, the decision circuit 152 is also bypassed and the halftoning circuit 159 replaces the white pixel with an all white 2×2 binary pattern, as shown in part (b) of FIG. 3. When a pixel is 50% gray and the next bit of the binary watermark data from the binary data source 400 is 1, the halftoning circuit 155 replaces the 50% gray pixel with a 2×2 binary pattern having black dots forming a pattern having a 45° polarized angle, as shown in part (c) of FIG. 3. When a pixel is 50% gray and the next bit of the binary watermark data from the binary data source 400 is 0, the halftoning circuit 157 replaces the 50% gray pixel with a 2×2 binary pattern having black dots forming a pattern having a 135° polarized angle, as shown in part (d) of FIG. 3.

Figure 4:
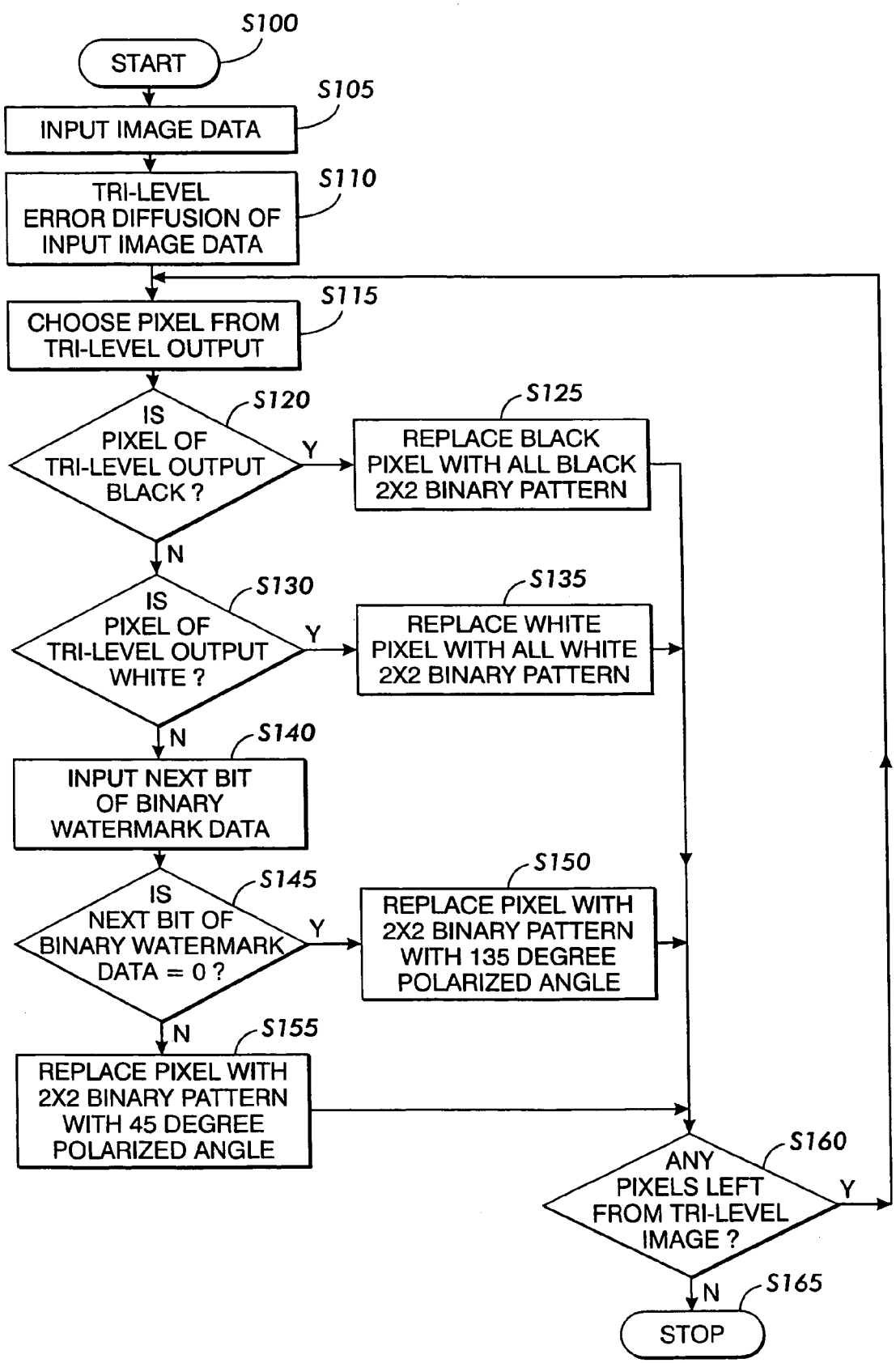
FIG. 4 is a flowchart illustrating a first exemplary embodiment of the method of embedding watermarks in an input image according to this invention.

It should be appreciated that which 2×2 binary pattern chosen to replace the current pixel when the corresponding bit of the binary watermark data have a particular value is not limited to that shown in FIG. 4. For example, when a bit of the binary watermark data is 0, the corresponding pixel can be replaced with a 2×2 binary pattern having a 45° polarized angle.

The 2×2 binary patterns for the 50% gray level have two different orientations. However, they have the same gray appearance, which allows the watermark to remain hidden in the final image. The tri-level halftone output from any continuous-tone input, except solid black, solid white and 50% gray inputs, will be a spatial combination of the intermediate-level bipolar patterns and either the black or the white patterns. Toggling the polarization between the two 2×2 binary patterns allows binary information to be arbitrarily embedded into any arbitrary image.

FIG. 4 is a flowchart outlining a first exemplary embodiment of a method for embedding visible watermark into received images according to this invention. Beginning in step S100, operation continues to step S105, where continuous tone image data is input. Next, in step S110, the input continuous tone image data is halftoned by tri-level error diffusion. Operation continues to step S115.

In step S115, a pixel is chosen from the halftoned image data. Next, in step S120, a determination is made whether the pixel of the tri-level output is black. If the pixel of the tri-level output is black, operation goes to step S125. Otherwise operation jumps to step S130. In step S125, the black pixel is replaced with an all black 2×2 binary pattern. Operation then jumps to step S160.

In step S130, a determination is made whether the pixel of the tri-level output is white. If the pixel of the tri-level output is white, operation goes to step S135. Otherwise, operation jumps to step S140. In step S135 the white pixel is replaced with an all white 2×2 binary pattern. Operation then again jumps to step S160.

In step S140, a next bit of binary watermark data is input. Then, in step S145, a determination is made, if the value of the next bit of the binary watermark data is 0. If the value of the next bit of the binary watermark data is 0, operation proceeds to step S150. Otherwise, operation jumps to step S155. In step S150, the pixel of the tri-level output is replaced with a 2×2 binary pattern having a 135° polarized angle. Operation then jumps to step S160. In contrast, in step S155, the pixel of the tri-level output is replaced with a 2×2 binary pattern having a 45° polarized angle. Operation then continues to step S160.

In step S160, a determination is made whether any pixels are left from the tri-level output. If there are pixels remaining, operation returns to step S115, where another pixel is chosen from the tri-level output. If there are no pixels remaining, operation continues to step S165, where operation of the method ends.

FIGS. 5A–5D show patches of images after being watermarked by the methods and systems according to this invention. In FIGS. 5A–5D, the 2×2 binary pattern shown in part (c) of FIG. 3 is chosen to replace a 50% gray pixel.

Figure 5:
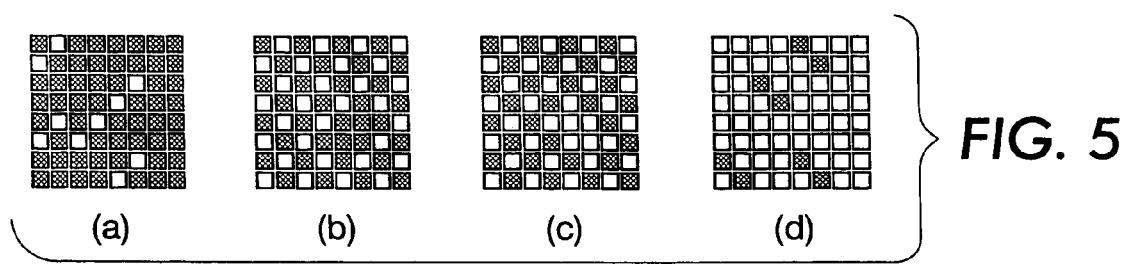
FIGS. 5A–5D show patches of output images after being watermarked by the first exemplary embodiment of the watermarked image generator according to this invention.

FIG. 5A shows the output of the watermarking embedding device according to this invention when the constant input represents a dark shadow region, or 0<u<<128, where u is the gray level of the input based on a 256 level scale. In this case, the white dots form patterns having a 45° polarized angle.

FIG. 5D shows the output of the watermarking embedding device according to this invention when the constant input represents a highlight region, or 128<<u<255. In this case, the black dots form a pattern having a 135° polarized angle.

When the gray level u of the constant input is exactly equal to 128, a perfect checkerboard pattern will form, and no information can be embedded. However, when the gray scale level u of the constant input is close to, but not equal to, 128, information is embedded id the input image at a larger scale. For example, FIG. 5D shows the output of the watermarking embedding device according to this invention when the constant input represents a dark mid-tone region, or 0<<u<128. In this case, large size black dots are formed having a 45° polarized angle. FIG. 5C shows the output of the watermarking embedding device according to this invention when the constant input represents a light mid-tone region, or 128<u<<255. In this case, large size white dots are formed having a 135° polarized angle.

Figure 6:
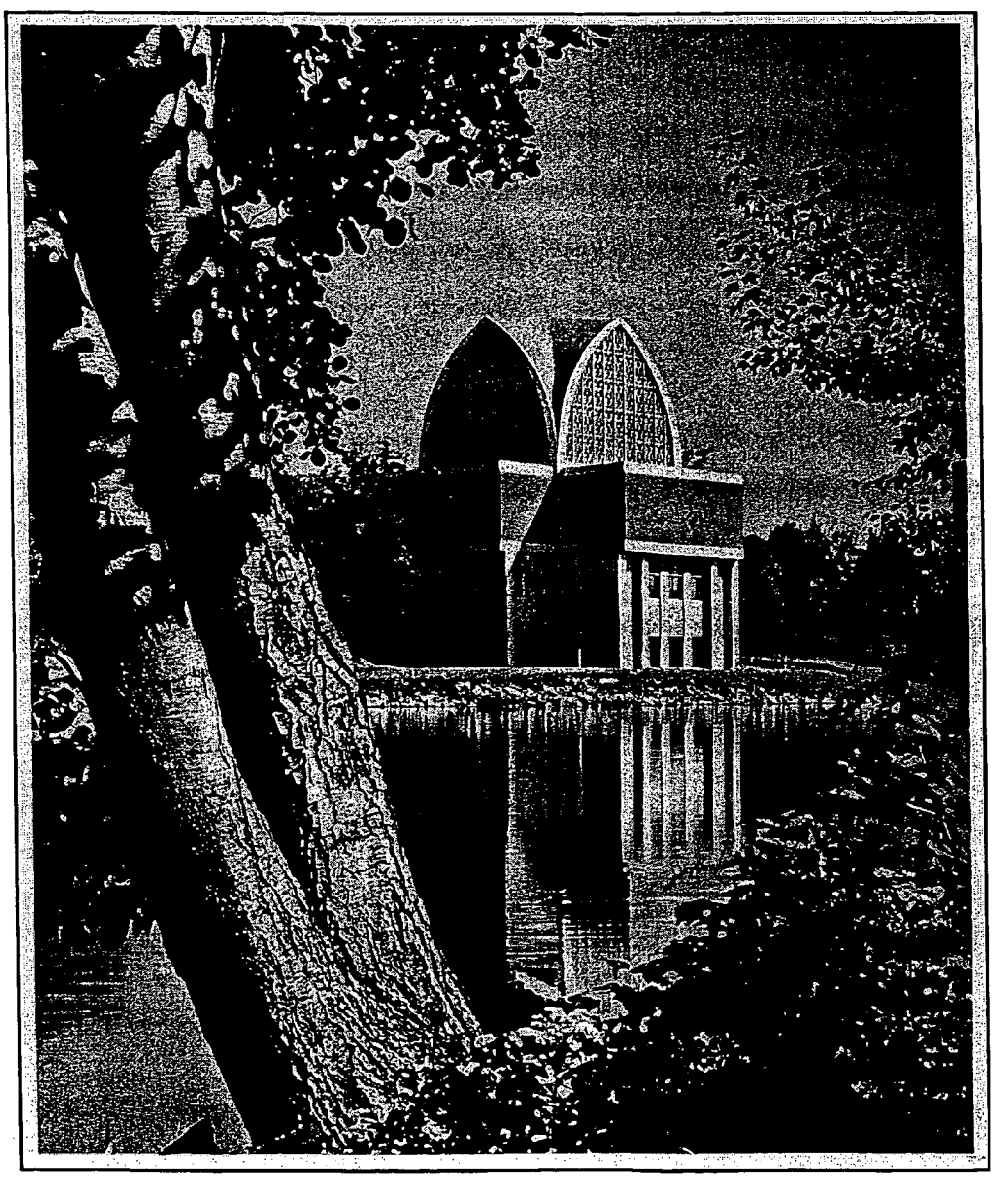
FIG. 6 is an error diffused image of a chapel incorporating a digital watermark generated according to this invention.

The following illustrative examples are made in reference to the image shown in FIG. 6. FIG. 6 shows an error diffused image of a chapel printed at 600 dpi.

EXAMPLE 1

Figure 7A:
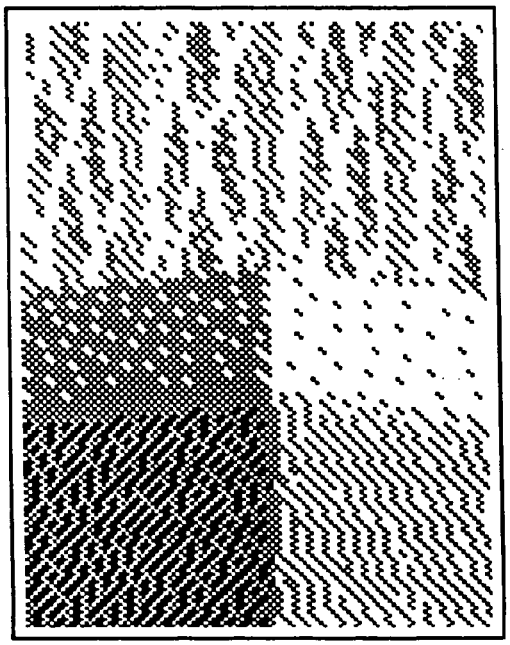
FIG. 7A shows a portion of the digital version of the image shown in FIG. 6 after being watermarked by the first exemplary embodiment of the method of embedding watermarks in an input image according to this invention.
Figure 7B:
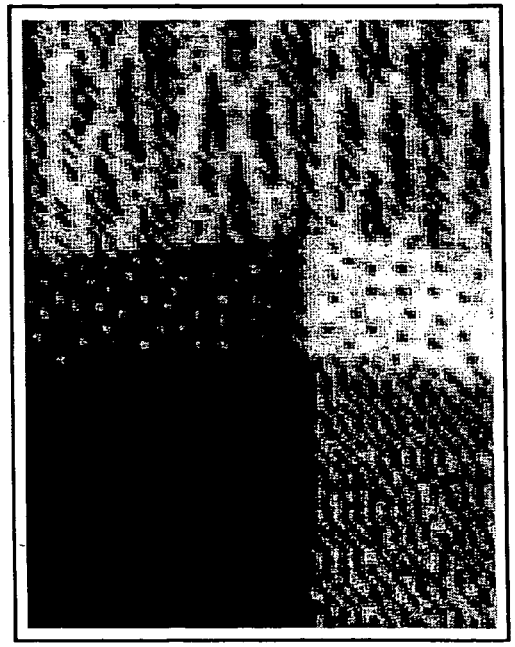
FIG. 7B shows the same portion of the image shown in FIG. 6 that is shown in FIG. 7a after being printed and scanned.

The watermark embedding method according to this invention is coded in C. All test images are halftoned and printed at 600 dpi, and then scanned at 600 spots per inch (spi). First, the image shown in FIG. 6 is halftoned by the method according to this invention using only the 2×2 pattern shown in part (c) of FIG. 3 to replace the intermediate level. FIG. 7A shows a portion of the digital version of the image shown in FIG. 6 after being watermarked by the method according to this invention. FIG. 7B shows the same portion of the image shown in FIG. 7A after being printed and scanned. The four distinct polarized structures shown in FIGS. 5A–D are visible in the images of FIGS. 7A and 7B.

EXAMPLE 2

The same as Example 1, except only the 2×2 pattern shown in part (d) of FIG. 3 is used to replace the intermediate level. FIG. 8A shows a portion of the digital version of the image shown in FIG. 6 after being watermarked by the method according to this invention. FIG. 8B shows the same portion of the image shown in FIG. 8A after being printed and scanned. FIGS. 8A and 8B are identical to FIGS. 7A and 7B, except for the different polarization of the watermarks.

EXAMPLE 3

Figure 11:
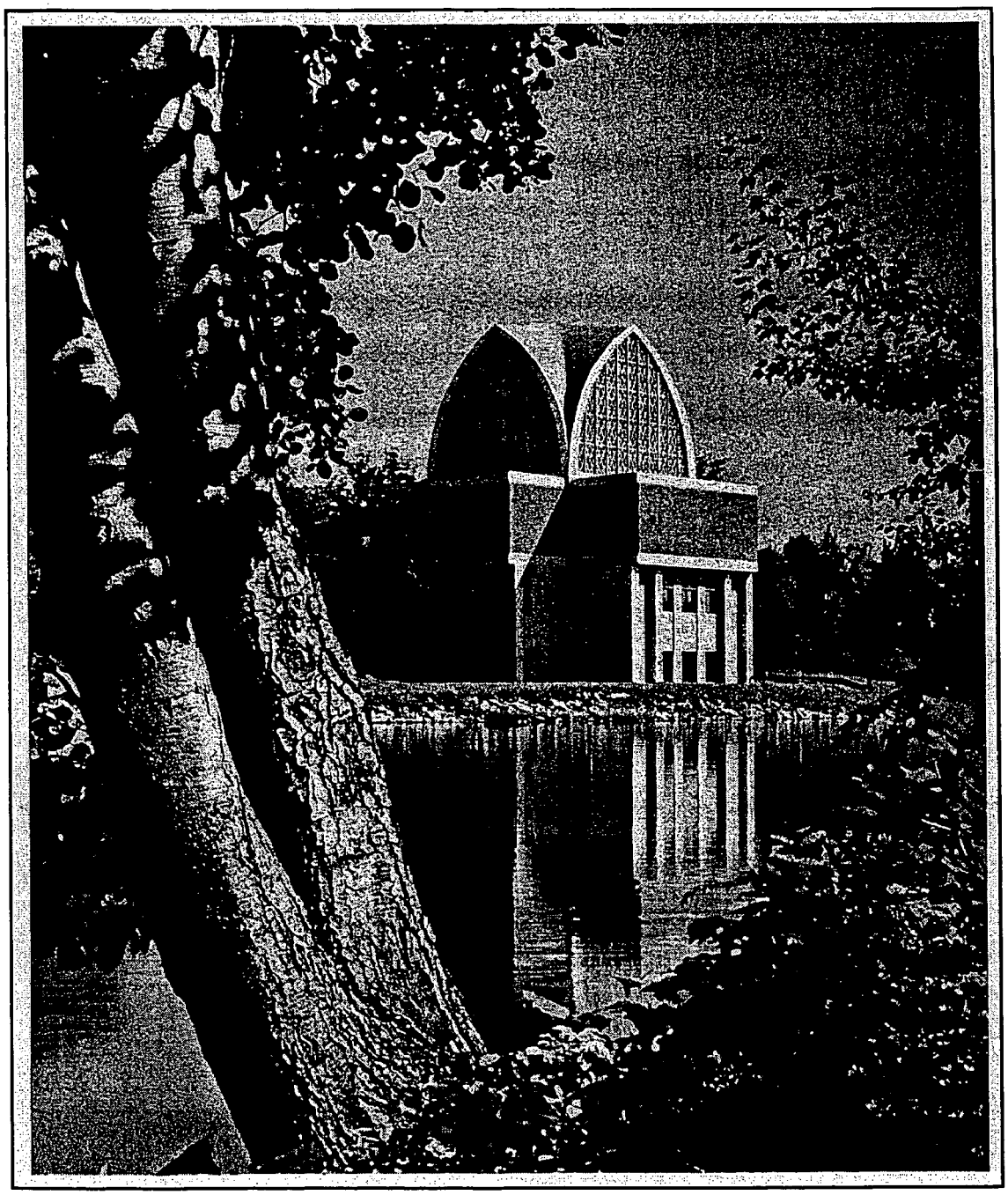
FIG. 11 shows the image shown in FIG. 6 after being embedded with a bar code by the first exemplary embodiment of the method of embedding watermarks in an input image according to this invention.

The watermarking method according to this invention is used to embed a bar code in the image shown in FIG. 6. One exemplary pattern for the one-dimensional bar code is {1,0,1,1,1,0,0,1,0,1}. Each bit of the bar code is encoded using two scanlines, and the bar code is repeated throughout the image. Two regions of the watermarked image are shown in FIGS. 9 and 10. The dot structures having different orientations are visible in FIGS. 9 and 10. FIG. 11 shows the entire image shown in FIG. 6 watermarked with the bar code. A comparison of the image shown in FIG. 11 with the image shown in FIG. 6 illustrates that the watermarking method according to this invention does not cause significant degradation of image quality.

Figure 12:
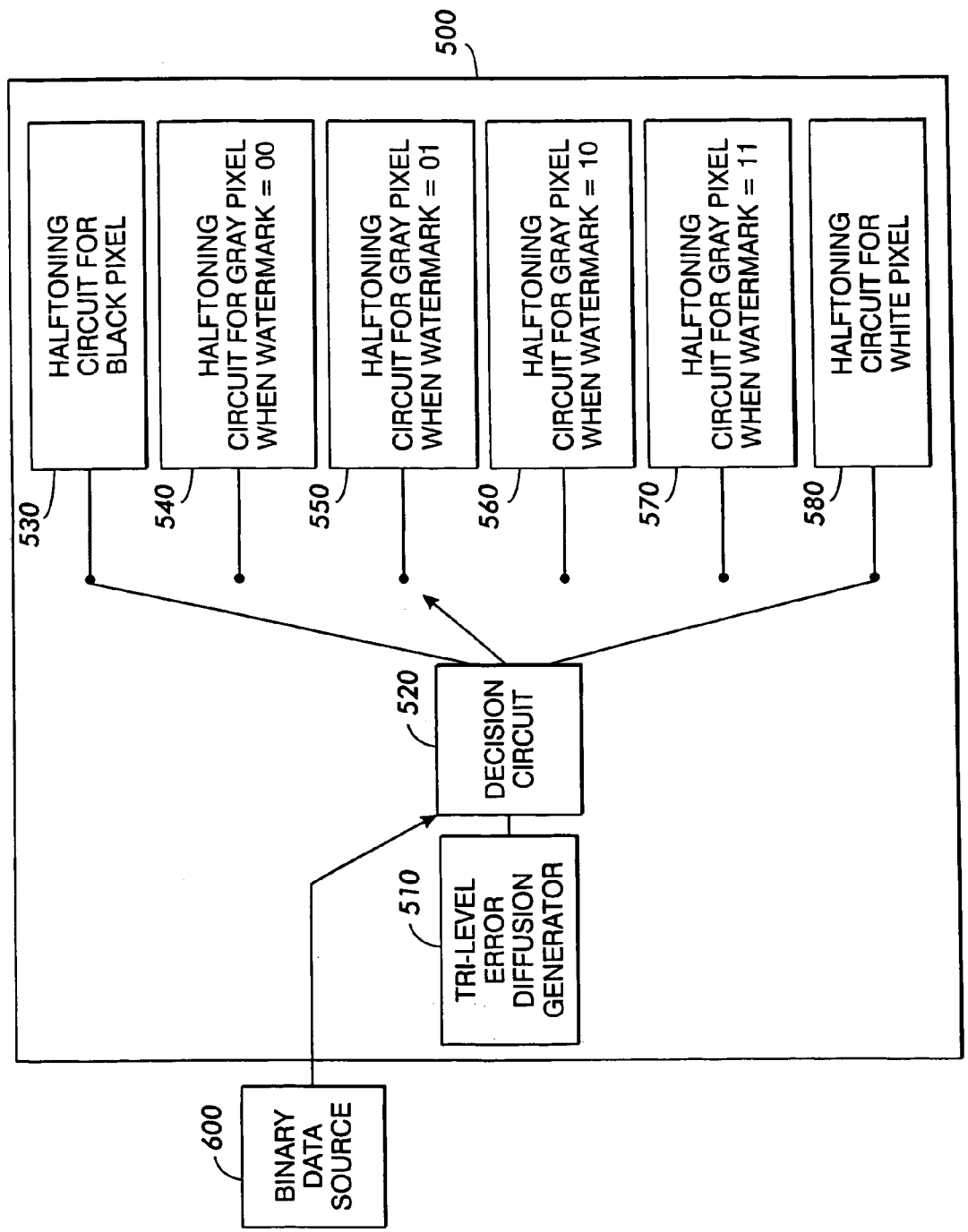
FIG. 12 shows a second exemplary embodiment of the watermark embedding device according to this invention.

FIG. 12 shows a second embodiment of a watermark embedding device 500 according to this invention. As shown in FIG. 12, the watermark embedding device 500 includes a tri-level error diffusion generator 510, a decision circuit 520, and halftoning circuits 530, 540, 550, 560, 570 and 580. As in the first embodiment shown in FIG. 2, the tri-level error diffusion generator 510 halftones a reduced resolution version of the original input continuous tone image data by tri-level error diffusion into three gray levels. The three gray levels to which the original image is halftoned are black, white, and 50% gray.

After the input image is halftoned by the tri-level error diffusion generator 510, the halftoning circuits 530, 540, 550, 560, 570 and 580 replace each one of the pixels of the halftoned input image by a corresponding one of six 2×2 binary patterns. Which of the six 2×2 binary patterns chosen to replace a particular pixel depends on whether the particular halftone pixel is black, white, or 50% gray, and/or on the value of the binary watermark stored in or input to the watermarked image generator 500 for that particular pixel. In this embodiment, the controller 120 sequentially feeds two bits, rather than a single bit as in the first embodiment, of the binary watermark data stored in the memory 130 or input by the user through the user input device 140 to the decision circuit 520. The source of the binary watermark data is shown generally in FIG. 12 as the binary data source 600.

Figure 13:
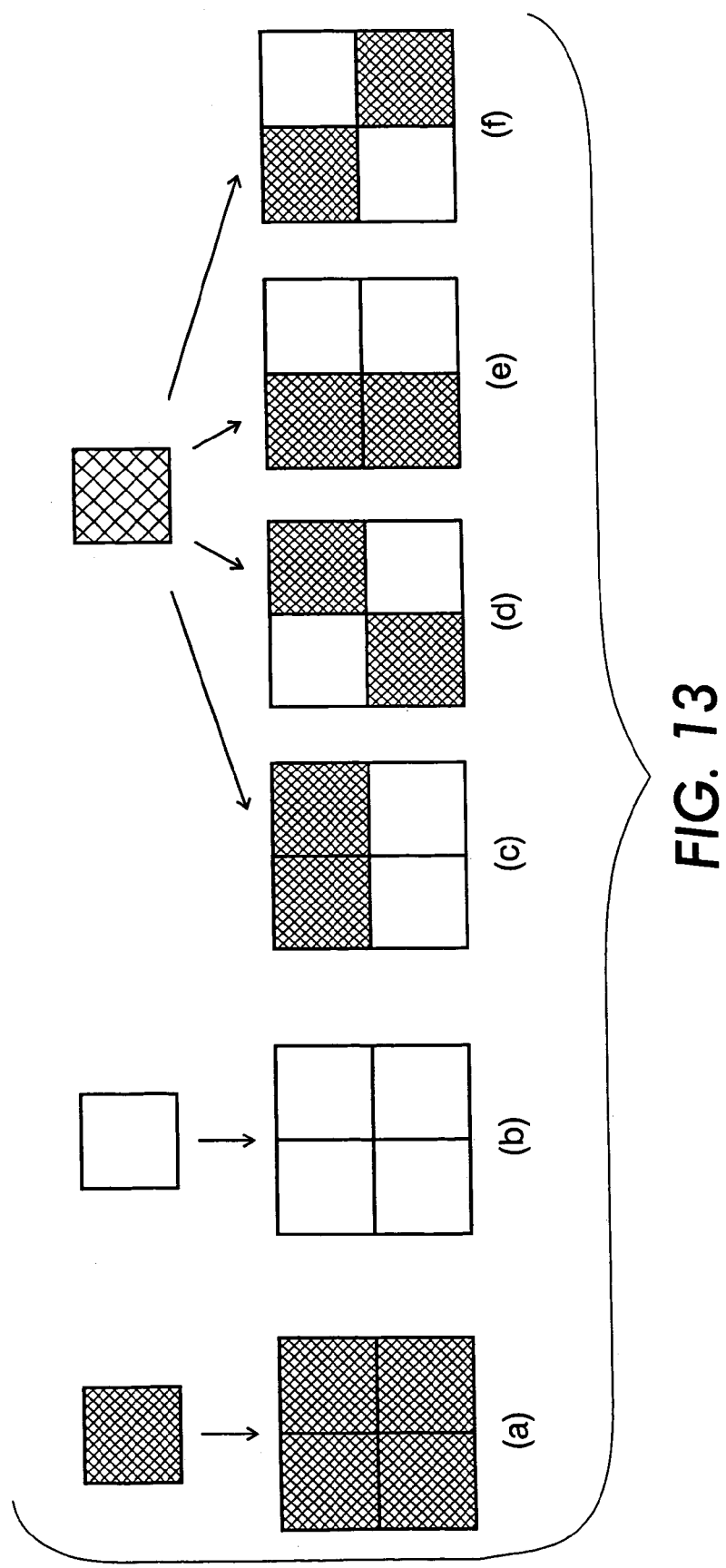
FIG. 13 shows the 2×2 binary patterns generated by the watermarked image generator according to the second exemplary embodiment of this invention.

When a pixel of the halftoned input image is black, the decision circuit 520 is bypassed and the halftoning circuit 530 replaces the black pixel with an all black 2×2 binary pattern, as shown in part (a) of FIG. 13. When a pixel of the halftoned image is white, the decision circuit 520 is again bypassed and the halftoning circuit 580 replaces the white pixel with an all white 2×2 binary pattern, as shown in part (b) of FIG. 13.

When a pixel is 50% gray and the bits of the binary watermark data are "00," the halftoning circuit 540 replaces the 50% gray pixel with a 2×2 binary pattern having black dots forming a pattern having a 0° polarized angle, as shown in part (c) of FIG. 13. When a pixel is 50% gray and the bits of the binary watermark data are "01," the halftoning circuit 550 replaces the 50% gray pixel with a 2×2 binary pattern having black dots forming a pattern having a 45° polarized angle, as shown in part (d) of FIG. 13.

When a pixel is 50% gray and the bits of the binary watermark data are "10," the halftoning circuit 560 replaces the 50% gray pixel with a 2×2 binary pattern having black dots forming a pattern having a 90° polarized angle, as shown in part (e) of FIG. 13. When a pixel is 50% gray and the bits of the binary watermark data are "11," the halftoning circuit 570 replaces the 50% gray pixel with a 2×2 binary pattern having black dots forming a pattern having a 135° polarized angle, as shown in part (f) of FIG. 13.

According to the second embodiment, the 2×2 binary patterns for the 50% gray level have four different orientations. However, they have the same gray appearance, which allows the watermark to remain hidden in the final image. The tri-level halftone image data output from any continuous tone input image, except solid black, solid white and 50% gray inputs, will be a spatial combination of the intermediate-level bipolar patterns and either the black or the white. Toggling the polarization between the four 2×2 binary patterns allows binary information to be arbitrarily embedded into an arbitrary image.

Figure 14A:
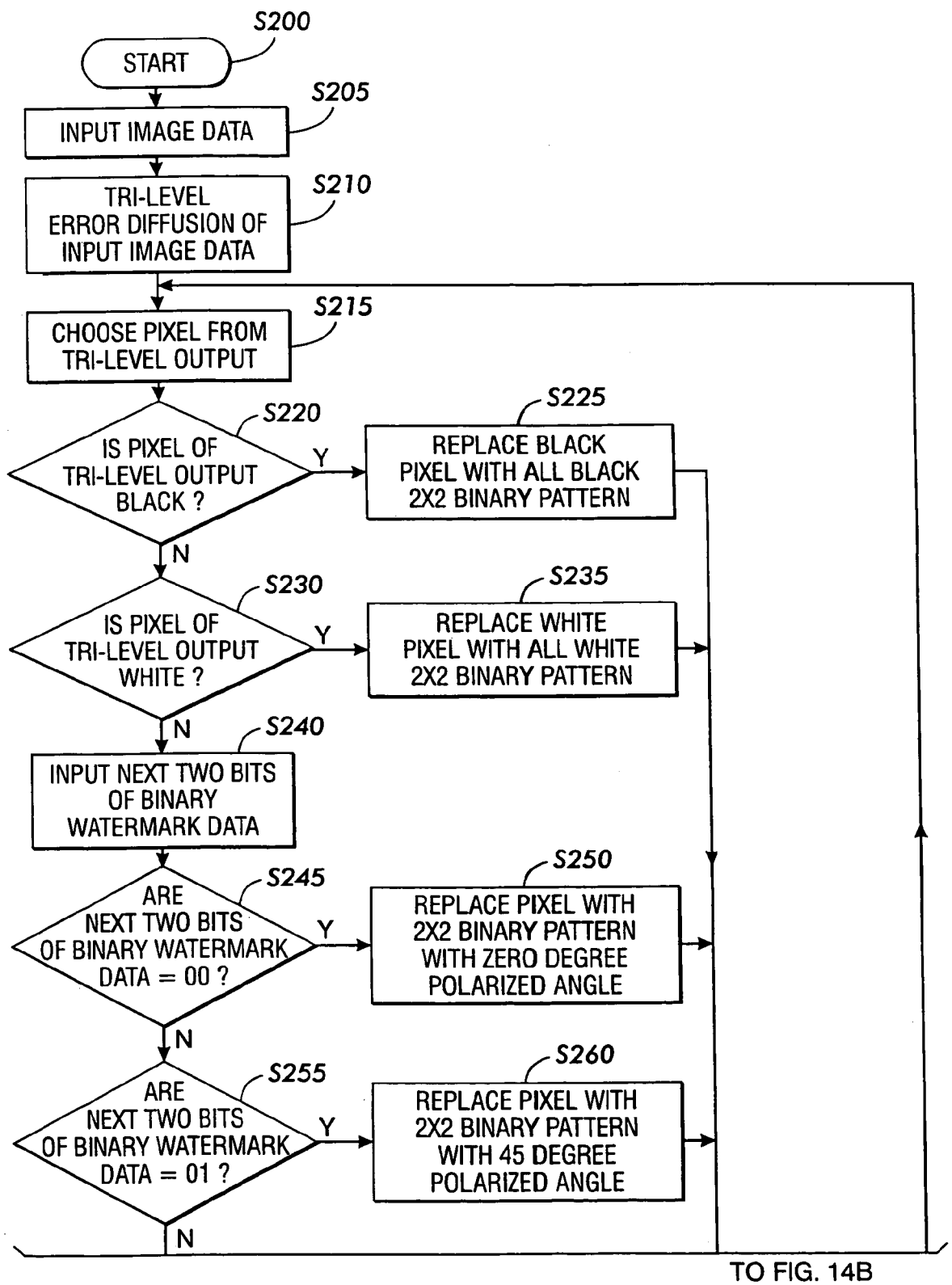
FIGS. 14A and 14B show a flowchart illustrating a second exemplary embodiment of the method of embedding watermarks in an input image according to this invention.
Figure 14B:
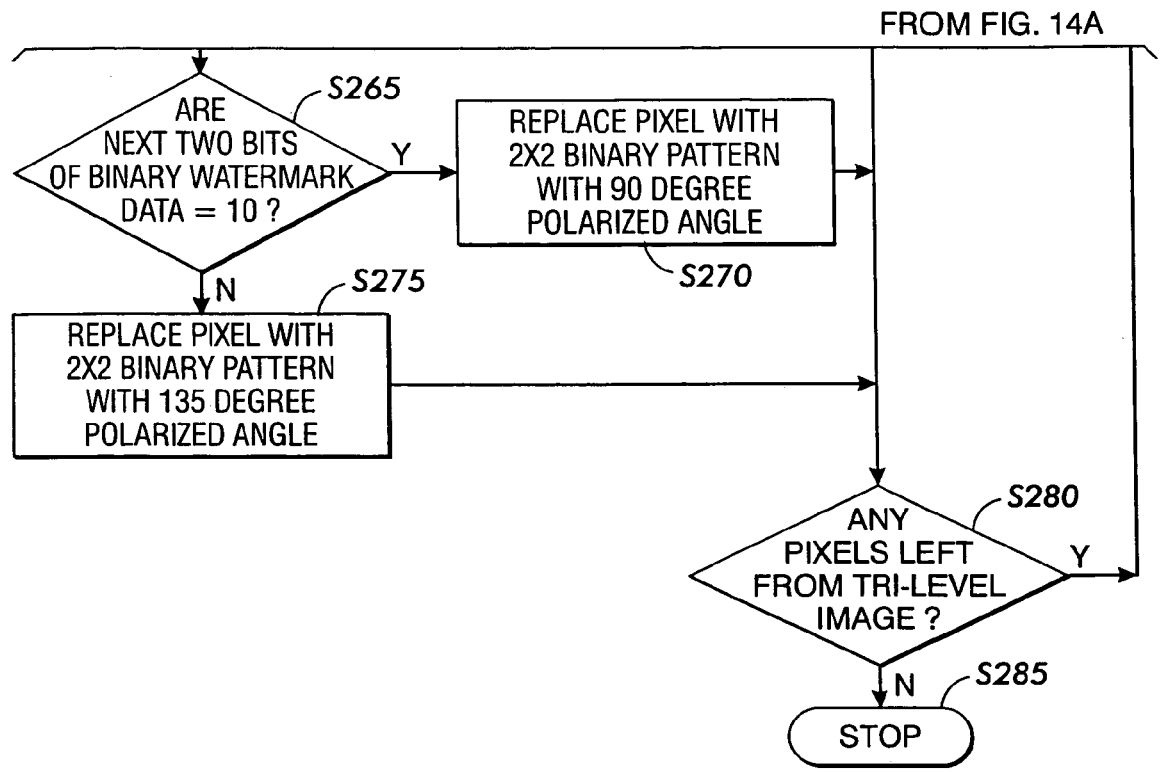

FIGS. 14A and 14B show a flowchart outlining a second exemplary embodiment of a method for embedding visible watermark into received images according to this invention. Beginning in step S200, operation continues to step S205, where continuous image data is input. Next, in step S210, the input continuous tone image data is halftoned by tri-level error diffusion. In step S215, a pixel is chosen from the halftoned image data. Next, in step S220, a determination is made whether the pixel of the tri-level output is black. If the pixel of the tri-level output is black, operation goes to step S225. Otherwise, operation jumps to step S230. In step S225, the black pixel is replaced with an all black 2×2 binary pattern. Operation then jumps to step S280.

In step S230, a determination is made whether the pixel of the tri-level output is white. If the pixel of the tri-level output is white, operation goes to step S235. Otherwise, operation jumps to step S240. The step S235, the white pixel is replaced with an all white 2×2 binary pattern. Operation then jumps to step S280.

In step S240, the next two bits of binary watermark data are input. Then, in step S245, a determination is made if the value of the next two bits of the binary watermark data are 00. If the value of the next two bits of the binary watermark data are 00, operation proceeds to step S250. Otherwise, operation jumps to step S255. The step S250, the pixel of the tri-level output is replaced with a 2×2 binary pattern having a 0° polarized angle. Operation then jumps to stop S280.

In step S255, a determination is made if the value of the next two bits of the binary watermark data are 01. If the value of the next two bits of the binary watermark data are 01, operation goes to step S260. Otherwise, operation jumps to step S865. In step S260, the pixel of the tri-level output is replaced with a 2×2 binary pattern having a 45° polarized angle. Operation then jumps to step S280.

In step S265, a determination is made if the value of the next two bits of the binary watermark data are 10. If the next two bits of the binary watermark data are 10, operation goes to step S270. Otherwise, operation jumps to step S275. In step S270, the pixel of the tri-level output is replaced with a 2×2 binary pattern having a 90° polarized angle. In contrast, in step S275, the pixel of the tri-level output is replaced with a 2×2 binary pattern having a 135' polarized angle. Operation then continues to step S280.

In step S280, a determination is made whether any pixels are left from the tri-level output. If there are pixels remaining, operation returns to step S215, where another pixel is chosen from the tri-level output. If there are no pixels remaining, operation continues to step S285, where operation of the method ends.

It should be appreciated that which 2×2 binary pattern chosen to replace the current pixel when the corresponding two bits of the binary watermark data have particular values is not limited to that shown in FIGS. 14A and 14B. For example, when the bits of the binary watermark data are 00, the corresponding pixel can be replaced with a 2×2 binary pattern having a 45° polarized angle.

The various exemplary embodiments of the systems and methods according to this invention can be used to embed many types of information in an original image. For example, the methods and systems according to this invention can be used to embed a segmentation map in a printed document image. Document images can be segmented into regions that have distinct properties, such as text, pictures and graphics. A segmentation map is an indexed image, where the index of a pixel is the class label of a corresponding pixel or a corresponding group of pixels in the original image. Because regions having different characteristics need to be processed and rendered differently, image segmentation is crucial for generating or re-producing high quality document images.

Conventionally, the segmentation map of a document image is often only available before the image is printed. However, it is discarded when the image is rendered. If the printed image is digitally scanned, the segmentation map needs to be generated again, since it is difficult to recover from the printed document. Thus, it is desirable to embed the segmentation map in the printed document image for fast and accurate retrieval.

A segmentation map can be embedded into an image either with encoding or without encoding. When a segmentation map is not encoded, the segmentation map is directly embedded into an image. In this case, the segmentation map is directly correlated with the image content. Thus, even if the printed image is altered, such as cropped, or rotated, the segmentation map can still be recovered. Embedding the segmentation map without encoding also improves robustness to detection errors. That is, in this case, the effect of a wrong detection can be locally contained.

Figure 15:
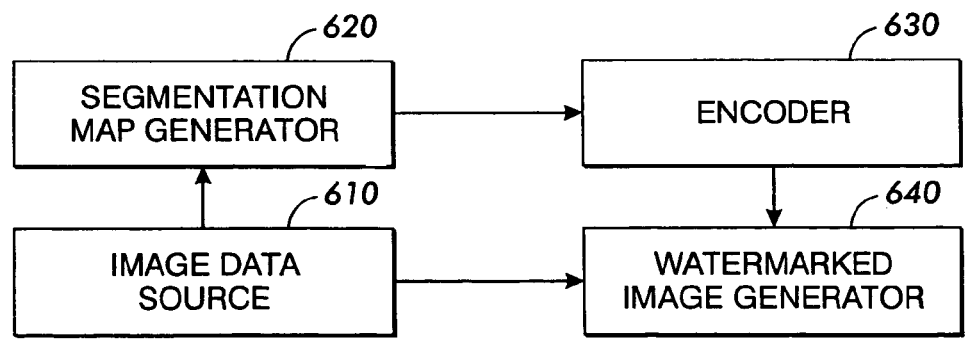
FIG. 15 shows a segmentation map embedding device that encodes a segmentation map before embedding the segmentation map into an image.

On the other hand, by embedding with encoding, the amount of data that needs to be embedded can be drastically reduced. FIG. 15 shows a segmentation map embedding device that encodes a segmentation map before embedding the segmentation map into an image. The segmentation map embedding device 600 includes an image data source 610, a segmentation map generator 620, an encoder 630, and a watermarked image generator 640. The image data source 610 inputs a digital image to the segmentation map generator 620. The segmentation map generator 620 generates a segmentation map of the image input by the original image source 610. The segmentation map is then input to the encoder 630. The encoder 630 encodes the segmentation map. The encoder 630 can encode the segmentation map by any suitable encoding process. For example, if all regions in a document image are assumed to be rectangular in shape, then each region can be coded using four numbers that specify the location and the dimension of a rectangular, followed by a class label. Generally, a segmentation map can be first compressed using either run-length coding, or predictive coding, followed by entropy coding.

After the segmentation map is encoded by the encoder 630, the encoded segmentation map is treated as a binary data source. The binary data from the encoded segmentation map is input to the watermarked image generator 640. The watermarked image generator 640 embeds the binary data from the encoded segmentation map in the image as watermarks using the various exemplary to embodiments of the systems and methods according to this invention.

Figure 16A:
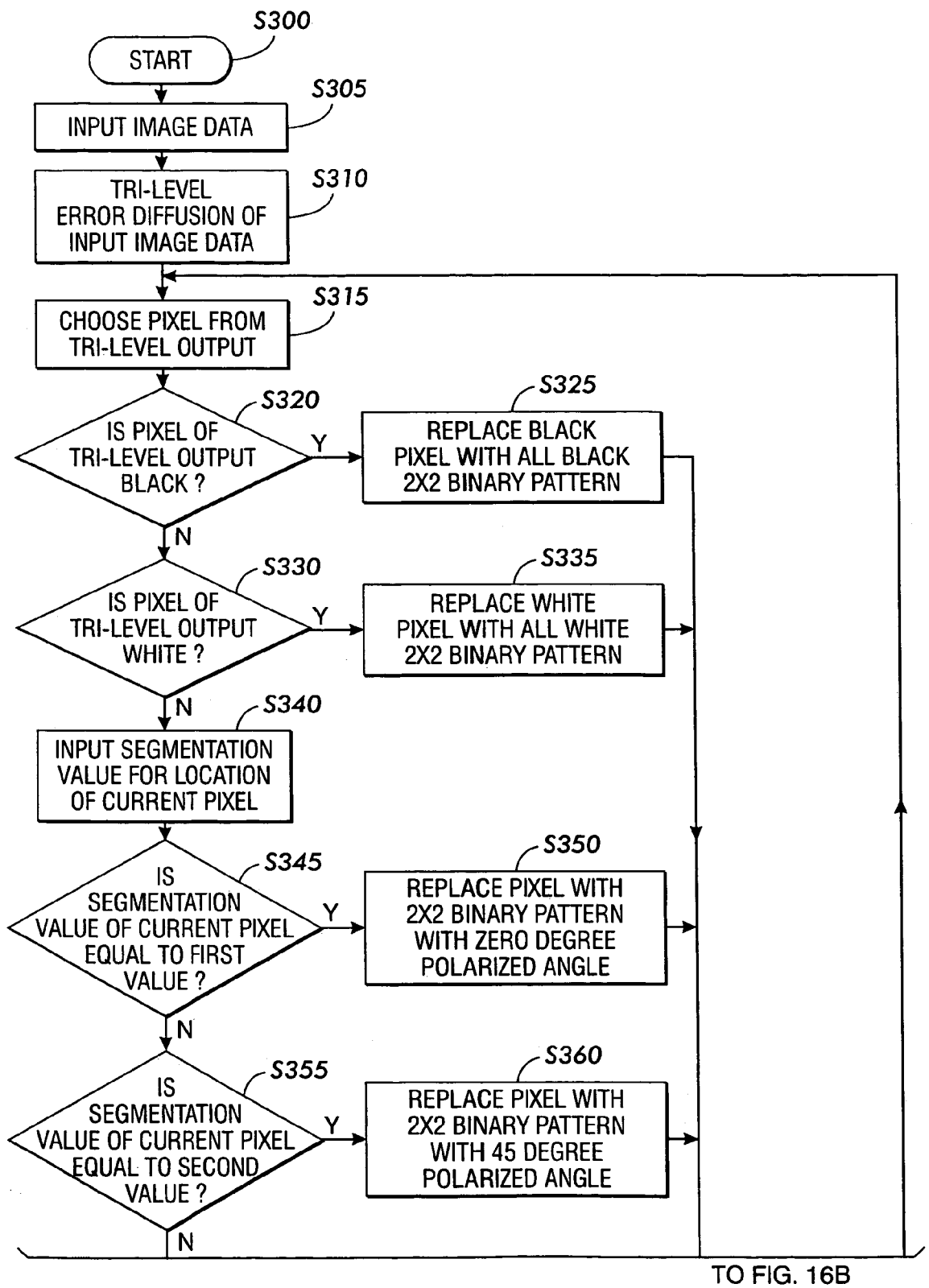
FIGS. 16A and 16B show a flowchart illustrating an exemplary embodiment of the method of embedding watermarks in an input image according to this invention.
Figure 16B:
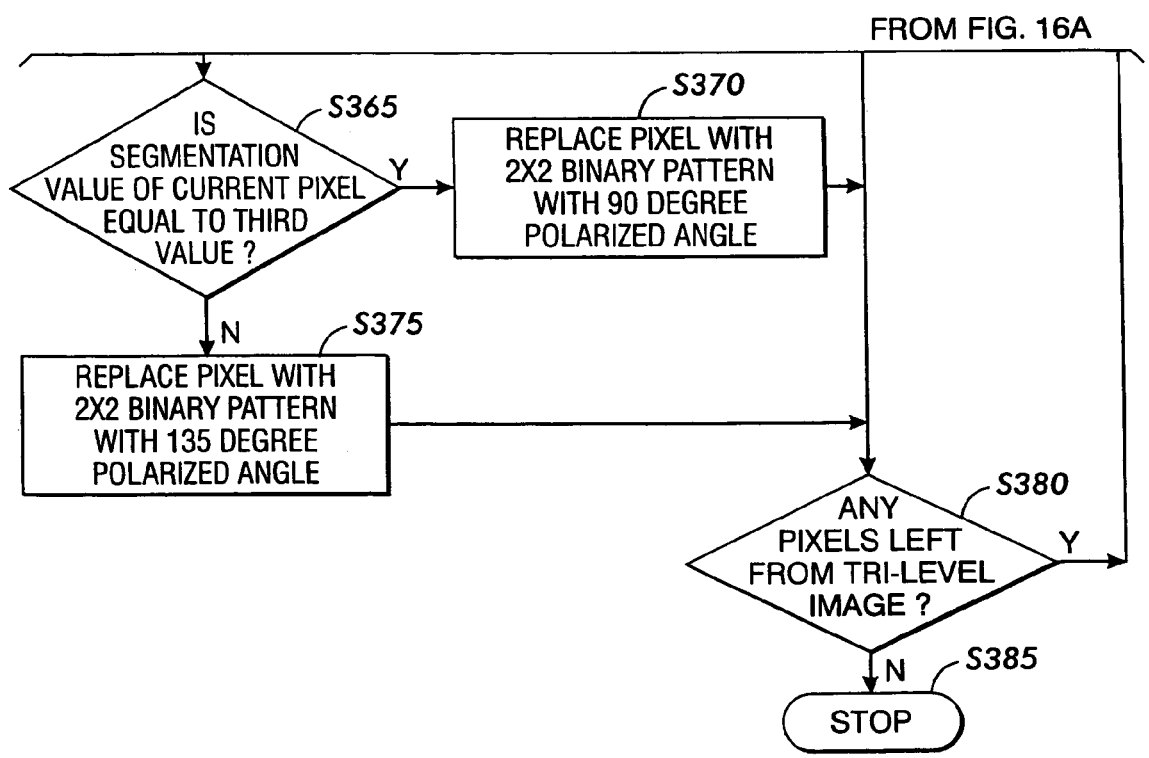

FIGS. 16A and 16B show a flowchart outlining the embedding of binary segmentation values into an input image using the second embodiment of the method for embedding a watermark into an image according to this invention. Beginning in step S300, operation continues to step S305 where continuous tone image data is input. Next, in step S310, the input continuous tone image data is halftoned by tri-level error diffusion. In step S315, a pixel is chosen from the halftoned image data. Next in step S320, a determination is made whether the pixel of the tri-level output is black. If the pixel of the tri-level output is black, operation goes to step S325. Otherwise, operation goes to step S330. In step S325, the black pixel is replaced with an all black 2×2 binary pattern. Operation then jumps to step S380.

In step S330, a determination is made whether the pixel of the tri-level output is white. If the pixel of the tri-level output is white, operation goes to step S335. Otherwise, operation goes to step S330. In step S325, the white pixel is replaced with an all white 2×2 binary pattern.

In step S340, the next two bits of the binary segmentation map data are input.

Operation then continues to step S345. In step S345, a determination is made whether the values of the next two bits of the binary segmentation map data are 00. If the values of the next two bits of the binary segmentation map data are 00, then operation goes to step S210. Otherwise, operation goes to step S355. In step S350, the current pixel is replaced with a 2×2 binary pattern having a 0° polarized angle. Operation then jumps to step S380.

In step S355, a determination is made whether the values of the next two bits of the binary segmentation map data are 01. If the values of the next two bits of the binary segmentation map data are 01, then operation goes to step S360. Otherwise, operation goes to step S365. In step S360, the current pixel is replaced with a 2×2 binary pattern having a 45° polarized angle. Operation then jumps to step S380.

In step S365, a determination is made whether the values of the next two bits of the binary segmentation map data are 10. If the values of the next two bits of the binary segmentation map data are 10, then operation goes to step S370. Otherwise, operation goes to step S375. In step S370, the current pixel is replaced with a 2×2 binary pattern having a 90° polarized angle. In contrast, in step S375, the current pixel is replaced with a 2×2 binary pattern having a 135° polarized angle.

In step S380, a determination is made whether any pixels are left from the tri-level image. If there are pixels remaining, operation returns to step S315, where another pixel is chosen from the tri-level output. If there are no pixels remaining, operation continues to step S385, where operation of the method ends.

It should be appreciated that which 2×2 binary pattern chosen to replace the current pixel when the corresponding two bits of the binary segmentation map data have particular values is not limited to that shown in FIGS. 16A and 16B. For example, if the next two bits of the binary segmentation map data are 00, the current pixel can be replaced with a 2×2 binary pattern having a 135° polarized angle.

EXAMPLE 4

The third embodiment of the watermark embedding method according to this invention is coded in C and tested. All test images are halftoned and printed at 600 dots per inch (dpi), then scanned at 600 dpi. Each 2×2 block of pixels is manually classified into three classes: pictorial regions, text and graphics on solid background, and text and graphics on halftone background. The black regions indicate pictures, the gray regions indicate text on halftone background, and the white regions indicate text on solid background. The segmentation map is directly embedded in the original image, without encoding. The three segmentation classes are represented by the 45°, 90° and 135° 2×2 polarized patterns shown in parts (d)–(f) of FIG. 13, respectively.

The retrieval of watermarks embedded by the various exemplary embodiments of the systems and methods according to this invention requires only the detection of the polarizations of the dot structures on the watermarked image. Thus, retrieval is relatively easy and robust. One exemplary embodiment of a method of retrieving watermarks embedded by the various exemplary embodiments of the systems and methods according to this invention includes scanning the printed image with a scanner having a resolution at least equal to the resolution of the embedded watermark. The watermarks in the digitized image can be detected using pattern matching methods that are well known in the art.

Figure 17:
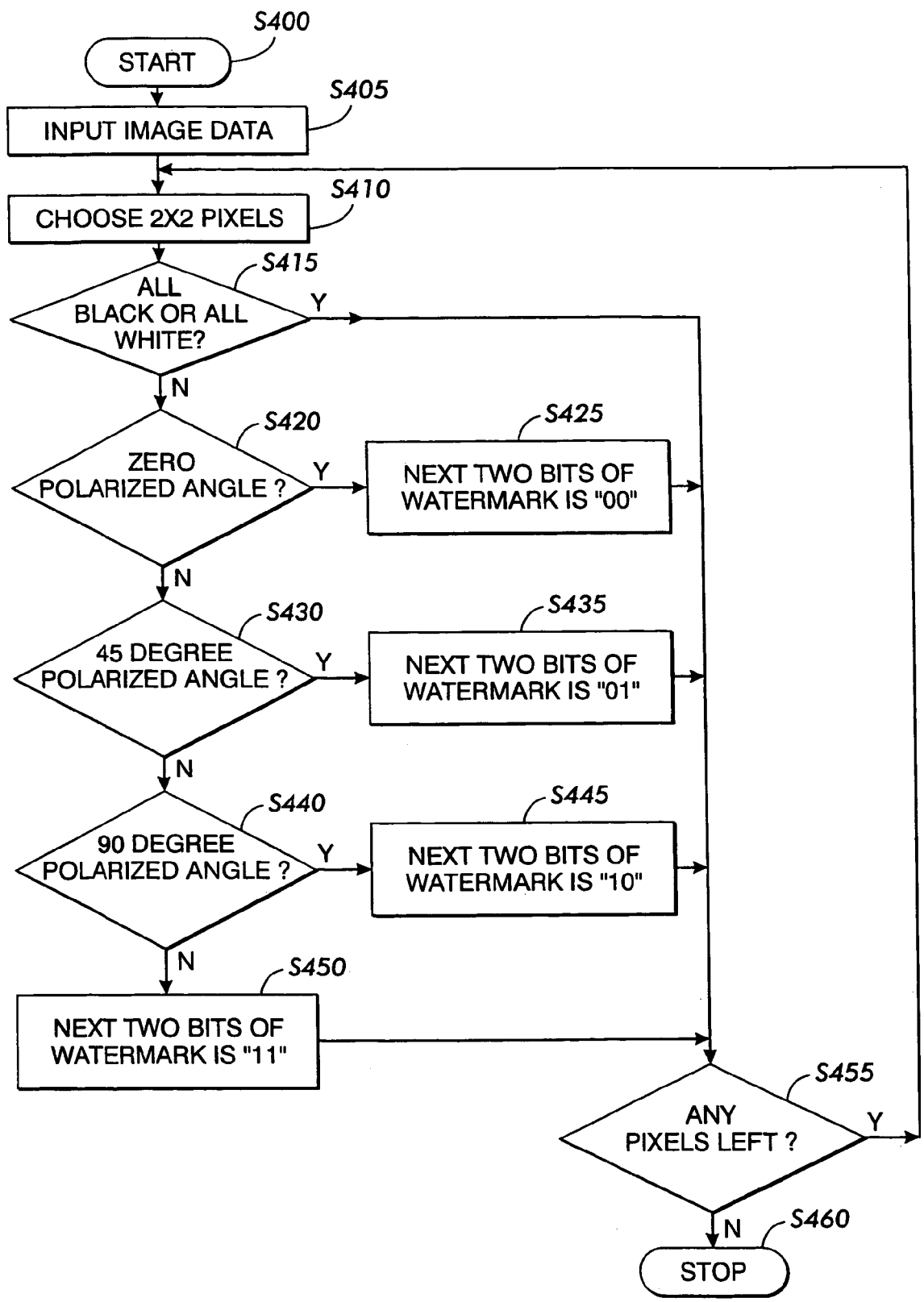
FIG. 17 is a flow chart illustrating the embedding of binary segmentation values into an input image using the second embodiment of the method for embedding a watermark into an image according to this invention.

FIG. 17 is a flowchart outlining one exemplary embodiment of a method of retrieving watermarks embedded by the various exemplary embodiments of the systems and methods according to this invention. Beginning in step S400, operation continues to step S405, where the watermarked image data is input. Next, in step S410, a 2×2 pixel pattern is chosen from the watermarked image data. Next, in step S415, a determination is made whether the 2×2 pixel pattern is all white or all black. If the 2×2 pixel pattern is all white or all black, operation goes to step 455. Otherwise, operation goes to step S420.

In step S420, a determination is made whether the 2×2 binary pattern has a 0° polarized angle. If the 2×2 binary pattern has a 0° polarized angle, operation goes to step S425. Otherwise, operation goes to step S430. In step S425, the values of the next two bits of the watermark data are determined to be 00. Operation then jumps to step S455.

In step S430, a determination is made whether the 2×2 binary pattern has a 45° polarized angle. If the 2×2 binary pattern has a 45° polarized angle, operation goes to step S435. Otherwise, operation goes to step S440. In step S435, the values of the next two bits of the watermark data are determined to be 01. Operation then jumps to step S455.

In step S440, a determination is made whether the 2×2 binary pattern has a 90° polarized angle. If the 2×2 binary pattern has a 90° polarized angle, operation goes to step S445. Otherwise, operation goes to step S450. In step S445, the values of the next two bits of the watermark data are determined to be 10. In contrast, in step S450, the values of the next two bits of the watermark data are determined to be 11. Operation then continues to step S455.

In step S455, a determination is made whether any pixels are left from the watermarked image data. If there are pixels remaining, operation returns to step S410, where another 2×2 binary pattern is chosen from the watermarked image data. If there are no pixels remaining, operation continues to step S460, where operation of the method ends.

It should be appreciated that which values for idle next two bits of the watermark chosen to correspond to the 2×2 binary pattern of the binary watermarked image data is not limited to those shown in FIG. 17. For example, if the 2×2 binary pattern has a 90° polarized angle, the values of the next two bits of the watermark data can be determined to be 11.

While this invention has been described in conjunction with the specific exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A watermarked image generator that embeds watermarks into an input image to generate a watermarked output image, comprising:
   a watermark data source that inputs watermark data to a watermark embedding device, the watermark embedding device halftoning the input image to generate the output image made of 2×2 binary patterns, the 2×2 binary patterns forming the watermarks embedded in the output image,
   wherein the watermark embedding device includes:
      a tri-level error diffusion generator that performs tri-level error diffusion on a reduced resolution version of the input image by halftoning the input image into black, white and 50% gray; and
      a plurality of halftoning circuits that successively replace each pixel of the halftoned input image with one of a plurality of the 2×2 binary patterns, the one of the plurality of 2×2 binary patterns being selected based on at least one bit of the watermark data when a pixel of the halftoned image data is 50% gray.

2. The watermarked image generator according to claim 1, wherein, when a pixel of the halftoned image data is white, the one of the plurality of 2×2 binary patterns forms an all white pattern.

3. The watermarked image generator according to claim 1, wherein, when a pixel of the halftoned image data is black, the one of the plurality of 2×2 binary patterns forms an all black pattern.

4. The watermarked image generator according to claim 1, wherein the watermark data is binary data, and, when a pixel of the halftoned image data is 50% gray, the one of the 2×2 binary patterns forms one of a plurality of polarized patterns, the one of the plurality of polarized patterns is polarized according to the status of the at least one bit of the binary data.

5. The watermarked image generator according to claim 1, wherein the one of the plurality of 2×2 binary patterns is selected based on two bits of the watermark data when a pixel of the halftoned image is 50% gray.

6. The watermarked image generator according to claim 5, wherein the watermark data is binary data, and, when a pixel of the halftoned image data is 50% gray, the one of the 2×2 binary patterns forms one of a plurality of polarized patterns, the one of the plurality of polarized patterns is polarized according to the values of each of the two bits of the binary data.

7. The watermarked image generator according to claim 1, wherein the watermark data is segmentation values of each pixel of the halftoned input image, and, when a pixel of the halftoned input image data is 50% gray, the one of the 2×2 binary patterns forms one of a plurality of polarized patterns, the one of the plurality of polarized patterns is polarized according to the segmentation value for that pixel.

8. The watermarked image generator according to claim 1, wherein the input image is a continuous tone input image.

9. A method of embedding watermarks received from a watermark data source into an input image to generate a watermarked halftone output image, comprising:
   halftoning the input image by performing tri-level error diffusion on a reduced resolution version of the input image by halftoning the input image into black, white and 50% gray; and successively replacing each pixel of the halftoned input image with one of a plurality of the 2×2 binary patterns to generate the output image made of 2×2 binary patterns, the 2×2 binary patterns forming the watermarks embedded in the output image, the one of the plurality of 2×2 binary patterns selected being based on at least one bit of the watermark data when a pixel of the halftoned image data is 50% gray.

10. The method according to claim 9, wherein successively replacing each pixel of the halftoned input image with one of a plurality of the 2×2 binary patterns comprises replacing each white pixel of the halftoned image data with one of the plurality of 2×2 binary patterns forming an all white pattern.

11. The method according to claim 9, wherein successively replacing each pixel of the halftoned input image with one of a plurality of the 2×2 binary patterns comprises replacing each black pixel of the halftoned image data with one of the plurality of 2×2 binary patterns forming an all black pattern.

12. The method according to claim 9, wherein:
the watermark data is binary data; and
successively replacing each pixel of the halftoned input image with one of a plurality of the 2×2 binary patterns comprises replacing each 50% gray pixel of the halftoned image data with one of a plurality of polarized 2×2 binary patterns, the one of the plurality of polarized 2×2 binary patterns being polarized according to a value of the at least one bit of the binary data.

13. The method according to claim 9, wherein the one of the plurality of 2×2 binary patterns corresponds to two bits of the watermark data when a pixel of the halftoned image is 50% gray.

14. The method according to claim 13, wherein:
the watermark data is binary data; and
successively replacing each pixel of the halftoned input image with one of a plurality of the 2×2 binary patterns comprises replacing each 50% gray pixel of the halftoned image data with one of a plurality of polarized 2×2 binary patterns, the one of the plurality of polarized 2×2 binary patterns being polarized according to a value of two bits of the binary data.

15. The method according to claim 9, wherein:
the watermark data is segmentation values of each pixel of the halftoned input image; and
successively replacing each pixel of the halftoned input image with one of a plurality of the 2×2 binary patterns comprises replacing each 50% gray pixel of the halftoned image data with one of a plurality of polarized 2×2 binary patterns, the one of the plurality of polarized 2×2 binary patterns being polarized according to a segmentation value.

16. The method according to claim 9, wherein the input image is a continuous tone input image and the tri-level error diffusion is performed on the continuous tone input image.

* * * * *